H. E. OWEN.
POWER TRANSMISSION DEVICE.
APPLICATION FILED OCT. 28, 1919.

1,353,178.

Patented Sept. 21, 1920.
2 SHEETS—SHEET 1.

INVENTOR.
HARRY E. OWEN.
BY
ATTORNEY.

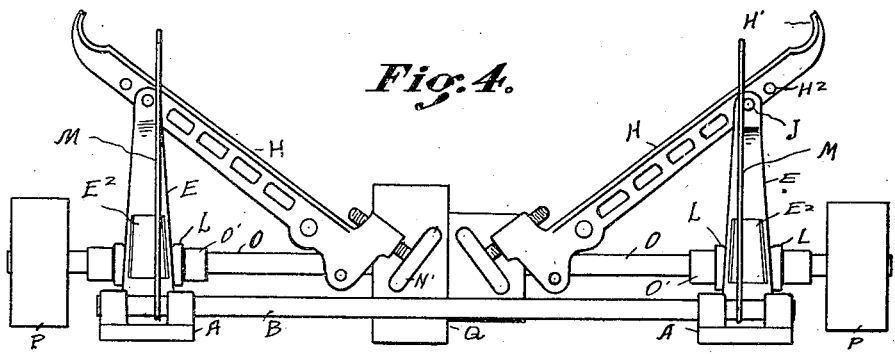
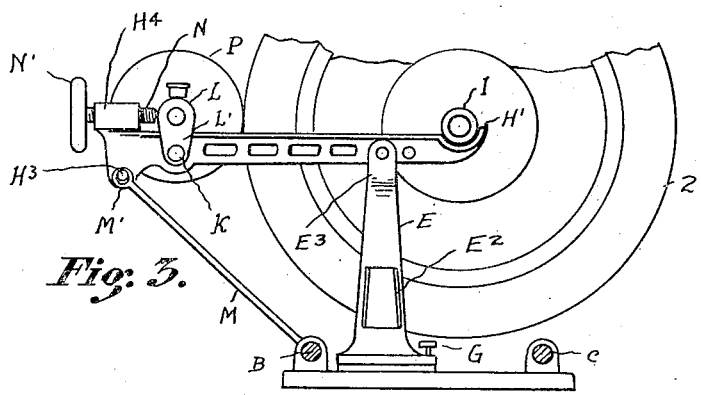
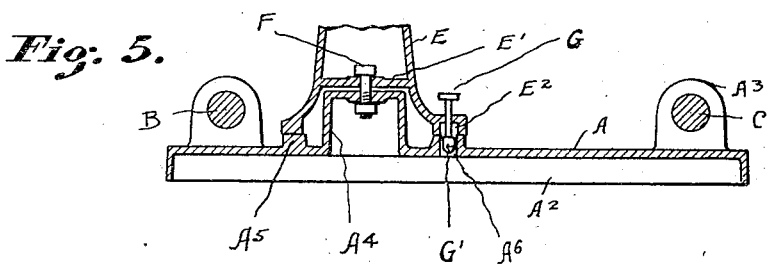

UNITED STATES PATENT OFFICE.

HARRY E. OWEN, OF MUNCIE, INDIANA.

POWER-TRANSMISSION DEVICE.

1,353,178.        Specification of Letters Patent.      Patented Sept. 21, 1920.

Application filed October 28, 1919. Serial No. 334,041.

*To all whom it may concern:*

Be it known that I, HARRY E. OWEN, a citizen of the United States, residing at Muncie, in the county of Delaware and State of Indiana, have invented certain new and useful Improvements in Power-Transmission Devices, of which the following is a specification.

This invention relates to improvements in power transmission devices of that class intended to be used in combination with the traction or driving wheels of the automobile.

Objects of this invention are to provide a power transmission device of simple and economical construction which is capable of being easily disposed for use, and as easily deposed or taken down; and by which a positive and dependable transmission of power from the automobile wheels may be obtained.

My invention is embodied in the construction, combination and arrangement of parts shown in the accompanying drawings, described in the following specification, and the invention is defined in the appended claims.

In the drawings, the several parts of the invention are identified by suitable characters of reference applied thereto, in the different views, in which—

Fig. 3 is a transverse sectional view taken on the line 3—3 in Fig. 1, and seen in the direction indicated by the arrow.

Fig. 4 is a view of the invention at the removed or detached position, the parts thereof being at the places assumed when the device is in readiness to be transported, or to be packed or crated for shipment.

Fig. 5 is a detached enlarged sectional view of the base plate and the connection thereto of the upright member.

This invention consists, broadly stated, of a pair of uprights retained at a proper spaced distance apart having base portions adapted to afford suitable bearing surface and to hold fast to the surface where set, lever arms trunnioned on the uprights and whose inner ends engage the underside of the rear axle of the automobile, frame members loose on the outer ends of the levers, a line shaft having its end portions journaled in the said frame members and having a driving pulley thereon, friction pulleys secured on the ends of said line shaft, the said uprights and lever arms being so adapted that when operated the automobile axle is raised, the driving wheels thereof being thereby freed from contact with the ground, and members carried by the base portions of the uprights to be engaged by the outer ends of the levers to hold the latter when at operative position.

Each of the base portions of my improved power transmission device consists of a cast steel base plate A of the form in cross section a shown in Fig. 5. The open form of construction of this plate constitutes the walls $A^2$ that take a firm hold on the ground or other surface where the plate is disposed and when the load or weight is imposed thereon. Near the ends of the base plate are the integrally formed lugs $A^3$ in whose transverse bores, the tie rods B and C, are secured by taper pins D and D. At a location suitably distant from the base plate is the integrally formed hollow boss $A^4$ of the suitable height as shown. Around this boss is a raised circular base ring $A^5$ which is machined to constitute a seat for the bottom face of the hollow cast steel upright or standard E. At a proper height from the bottom of this upright is a horizontal web $E^1$ which registers immediately above the top of the boss $A^4$. Through lateral opening $E^2$ in the upright, may be passed the bolt F which occupies suitable holes in the top of the boss $A^4$ and the web $E^1$, and which bolt when tightened holds the upright at position in engagement with the seat $A^5$. In a recess $E^2$ that is formed in the foot of the upright is loosely retained a lock pin G that has a head $G^1$ whose bottom is pilot shaped. Immediately underneath the recess $E^2$ (when the upright is at position as shown in Fig. 3) is a recess $A^6$ in the base ring $A^5$. The lock pin G with its head $G^1$ in the recess $A^6$ retains the upright in the position shown. When it is necessary to shift the position of the upright rotatively, as will presently be described, the pin G is raised and the upright may be turned or shifted on the seat $A^5$ to the position as shown in Fig. 4, there being freedom of movement at the bolt F which while holding the upright at true position on the seat A⁵ permits the upright to be shifted in the manner described.

Figure 1:
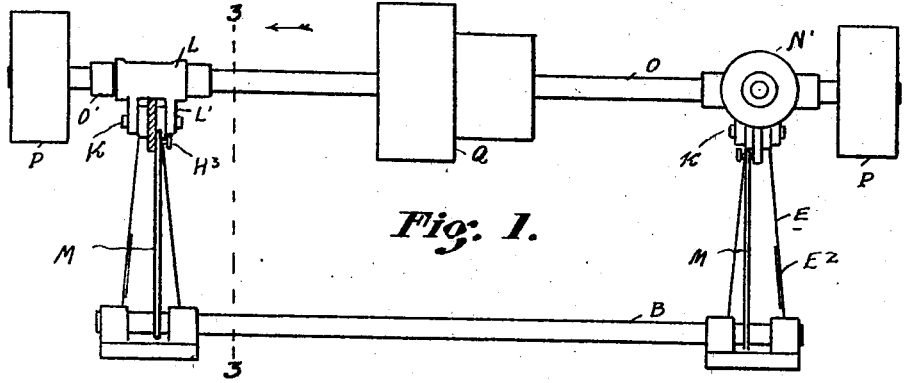
Figure 1 is a view of my improved transmission device, in operative position, one of the hand wheels $N^1$ being not shown.
Figure 2:
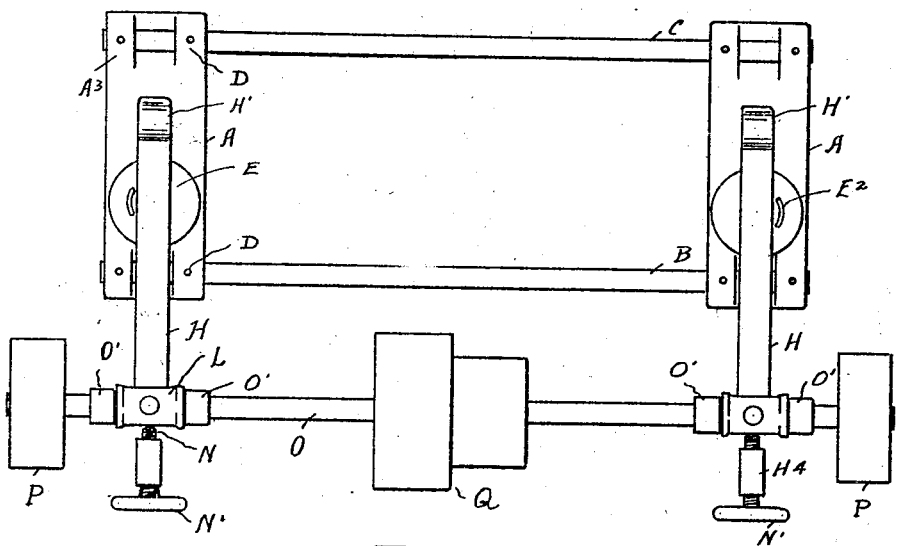
Fig. 2 is a top plan view of Fig. 1.

H and H designate lift bars. These lift bars, made of malleable or cast iron are similar in construction and in function. Each is provided at its inner end with the hook H¹ adapted to engage the underside of the automobile axle 1, and is fulcrumed at one of the holes H² on a bolt J that rests in the fork E³ of the upright. Near the outer end of the lift bar H is a transverse bore through which is passed a bolt K and upon which bolt is loosely supported the frame member L the legs L¹ of which register at each side of the lift bar H, as shown in Fig. 1. At the lower side of the outer end of the lift bar is a transverse stud H³ having a head thereon as shown in Fig. 1. When the holder or check bar M whose lower end is loosely retained on the tie rod B has its eye M¹ placed in engagement with the stud H³ the lift bar H is retained at the position raised, as shown. In the head portion H⁴ of the lift bar, and which head portion is in alinement with the center of the frame member L, is a threaded stem N whose inner end has bearing against the frame member L. By a hand wheel N¹ that is secured to the stem N the stem may be rotated whereby the position of the frame member with reference to the center of the automobile axle; and the driving wheel 2 thereon, may be varied. The frame member L constitutes a support and a journal bearing for the machine steel shaft O, and upon whose ends are secured the straight faced friction pulleys P and P. The shaft O is retained at correct position by suitable collars O¹ secured thereon at each side of the frame member L. At a proper central location on the shaft O is secured a transmission pulley. The form of pulley preferred is that shown in the drawings the same being the step type pulley Q, having diameters of 7 inches and 10 inches. For use in combination with automobile of standard tread gage, the distance center to center of the pulleys P and P is fifty-six inches.

My improved transmission device is capable of being installed and applied to use by a person of only ordinary skill in the handling and use of mechanical devices. The device, when in the knocked down or deposed position, is shown in Fig. 4, the bolts K having been removed, the pins G raised, the holder bars M detached from the studs H³, and uprights shifted; the lift bars being let down to the position shown; and the shaft O and the frame members L connected thereto, being let down to position on the base plates. The device in the knocked down condition shown, may be loaded for transport to the place where same is to be used; or it may be in this form crated for shipment.

To install same for use, the frame (consisting of the base plates connected as shown by the tie bars B and C) is disposed at position underneath the rear axle 1. The lift bars are then swung to position in longitudinal alinement with the base plates, the pins G being dropped to position in engagement with the base plates. When the device is arranged at proper alinement with reference to the automobile axle the hooks H¹ of the lift bars are placed at engagement with the under side of the axle; then the lift bars are lowered and acting as levers the axle is raised, the automobile wheels 2 being raised free from the surface upon which the base plates rest. The eyes M¹ of the holder bars are then placed at engagement with the studs H³ and the lift bars are retained at the operative position as shown in Fig. 3. The shaft O with its connected parts is then placed at position, the legs of the frame members L being at registration with the bore or hole in the lift bar and through which is inserted the bolt K. The assembling of the several parts being thus completed, the hand wheels N¹ are turned sufficiently to move the frame members L, thus urging the friction pulleys P and P to frictional engagement with the faces of the driving wheels 2 of the automobile.

A power transmission device constructed in accordance with my invention is of minimum weight, and is simple and economical of construction, and easy to transport and to manipulate. Moreover it is substantial in construction, durable and dependable. While in this specification I have shown the preferred form of details of construction and of proportion of the several parts, I am aware that minor changes and modifications may be made in the construction and arrangement of the parts, without departing from the nature or spirit of my invention or sacrificing any of its advantages.

What I claim as my invention, and desire to secure by Letters Patent, is—

1. A power transmission device of the kind described, comprising standards retained at a spaced distance apart, a lift bar fulcrumed on each standard and having its inner end adapted to engage the automobile axle, frame members trunnioned at the outer portions of said lift bars, a line shaft journaled in the frame members, friction pulleys on the line shaft to engage the automobile wheels, connecting members to retain the lift bars at operative position.

2. A power transmission device of the kind described, comprising a pair of standards retained at a spaced distance apart, a lift bar fulcrumed on each standard and having its inner end adapted to engage the underside of the automobile axle, frame members trunnioned on the outer portions of the said lift bars, a line shaft having its ends journaled in the frame members, pulleys on the line shaft to have contact with the automobile wheels, means to urge the frame members toward the automobile wheels, and holder bars from the bases to the lift bars to hold the latter at the operative position.

3. A power transmission device of the kind described, comprising a pair of standards retained at a spaced distance apart and each being loosely secured on a central pivotal connection, a lift bar fulcrumed on each standard and having its inner end adapted to engage the underside of the automobile axle, frame members trunnioned on the outer portions of the said lift bars, a line shaft having its ends journaled in the frame members, pulleys on the line shaft to have contact with the automobile wheels, means to urge the frame members toward the automobile wheels, and holder bars from the bases to the lift bars to hold the latter at the operative position.

4. A power transmission device, comprising a pair of bottom-flanged base plates, transverse connecting rods to retain said base plates a spaced distance apart, uprights pivotally secured to said base plates, a lift bar fulcrumed on each standard and having a hook shaped inner end, frame members trunnioned on the outer portions of the lift bars, a line shaft having its ends journaled in the frame members, pulleys on the line shaft to have contact with the automobile wheels, hand-wheel devices carried by the lift bars to urge the frame members toward the automobile axle, and holder bars from the base plates to the lift-bars to hold the latter at operative position.

In testimony whereof I affix my signature.

HARRY E. OWEN.